(12) United States Patent
Yao

(10) Patent No.: US 11,680,601 B1
(45) Date of Patent: Jun. 20, 2023

(54) HINGE WITH GEAR SYNCHRONIZATION MECHANISM

(71) Applicant: FOSITEK CORPORATION, New Taipei (TW)

(72) Inventor: Hsu-Hong Yao, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 17/678,745

(22) Filed: Feb. 23, 2022

(30) Foreign Application Priority Data

Dec. 16, 2021 (TW) .................................. 110147165

(51) Int. Cl.
*G06F 1/16* (2006.01)
*F16C 11/04* (2006.01)
*E05D 3/12* (2006.01)

(52) U.S. Cl.
CPC .............. *F16C 11/04* (2013.01); *E05D 3/122* (2013.01); *E05Y 2900/606* (2013.01)

(58) Field of Classification Search
CPC .................................. E05D 3/122; F16C 11/04
See application file for complete search history.

(56) References Cited

U.S. PATENT DOCUMENTS

| | | | | |
|---|---|---|---|---|
| 10,000,955 | B2 * | 6/2018 | Shang | F16C 11/045 |
| 10,480,225 | B1 * | 11/2019 | Hsu | E05D 3/12 |
| 11,408,214 | B1 * | 8/2022 | Hsu | E05D 3/18 |
| 2011/0000136 | A1 * | 1/2011 | Brun | E05F 15/605 49/358 |
| 2012/0096678 | A1 * | 4/2012 | Zhang | G06F 1/1681 16/302 |
| 2015/0267450 | A1 * | 9/2015 | Chiang | G06F 1/1681 16/354 |
| 2015/0362958 | A1 * | 12/2015 | Shang | G06F 1/1681 16/334 |
| 2016/0010374 | A1 * | 1/2016 | Hsu | G06F 1/16 74/414 |
| 2016/0011632 | A1 * | 1/2016 | Hsu | H04M 1/022 16/354 |
| 2016/0032633 | A1 * | 2/2016 | Hsu | E05D 3/122 16/368 |
| 2019/0249712 | A1 * | 8/2019 | Iannello | A44C 5/2066 |
| 2021/0325937 | A1 * | 10/2021 | Siddiqui | G06F 1/1679 |
| 2022/0365569 | A1 * | 11/2022 | Hsu | F16C 11/04 |

* cited by examiner

*Primary Examiner* — Jason W San
(74) *Attorney, Agent, or Firm* — Birch, Stewart, Kolasch & Birch, LLP

(57) ABSTRACT

A hinge includes a base frame unit and a rotating unit. The base frame unit includes a base seat having two rotating recesses and a transmitting recess, and two interfering plates respectively disposed in the rotating recesses. The rotating unit includes two rotating members respectively and rotatably disposed in the rotating recesses, and a bevel gear member disposed in the transmitting recess. Each rotating member frictionally interferes with the respective interfering plate, and has a bevel gear portion meshing with the bevel gear member. A torque generated as a result of rotation of one rotating member is transmitted through the bevel gear member to rotate the other rotating member relative to the base seat so as to make stable synchronous rotation of the rotating members.

8 Claims, 11 Drawing Sheets

HINGE WITH GEAR SYNCHRONIZATION MECHANISM

CROSS-REFERENCE TO RELATED APPLICATION

This application claims priority of Taiwanese Patent Application No. 110147165, filed on Dec. 16, 2021.

FIELD

The disclosure relates to a hinge for an electronic device, and more particularly to a hinge with a gear synchronization mechanism.

BACKGROUND

A conventional hinge with gear synchronization generally has an insufficient frictional torque due to clearance existing in the rotational rail thereof. Thus, the hinge is caused to have a feeling of looseness during rotation of the hinge, and an unstable shake in use, which renders the service life shortened.

SUMMARY

Therefore, an object of the disclosure is to provide a hinge that can alleviate at least one of the drawbacks of the prior art.

According to the disclosure, the hinge includes a base frame unit and a rotating unit. The base frame unit includes a base seat which is elongated in a front-rear direction, and two interfering plates. The base seat has an upper plate surface, two rotating recesses recessed from the upper plate surface and spaced apart from each other in the front-rear direction, and a transmitting recess recessed from the upper plate surface and interposed between and in communication with the rotating recesses. The interfering plates are disposed in the rotating recesses, respectively. The rotating unit includes two rotating members which are respectively and rotatably disposed in the rotating recesses, and a bevel gear member which is disposed in the transmitting recess. Each of the rotating members frictionally interferes with a respective one of the interfering plates, and has a bevel gear portion which meshes with the bevel gear member such that, a torque generated as a result of rotation of one of the rotating members relative to the base seat is transmitted through the bevel gear member to rotate the other one of the rotating members relative to the base seat so as to make synchronous rotation of the rotating members in opposite directions.

With the rotating members rotatably received in the rotating recesses and frictionally interfering with the interfering plates, a sufficient large frictional torque is produced during rotation of the rotating members, which renders the hinge stable and reduces undesired shaking.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
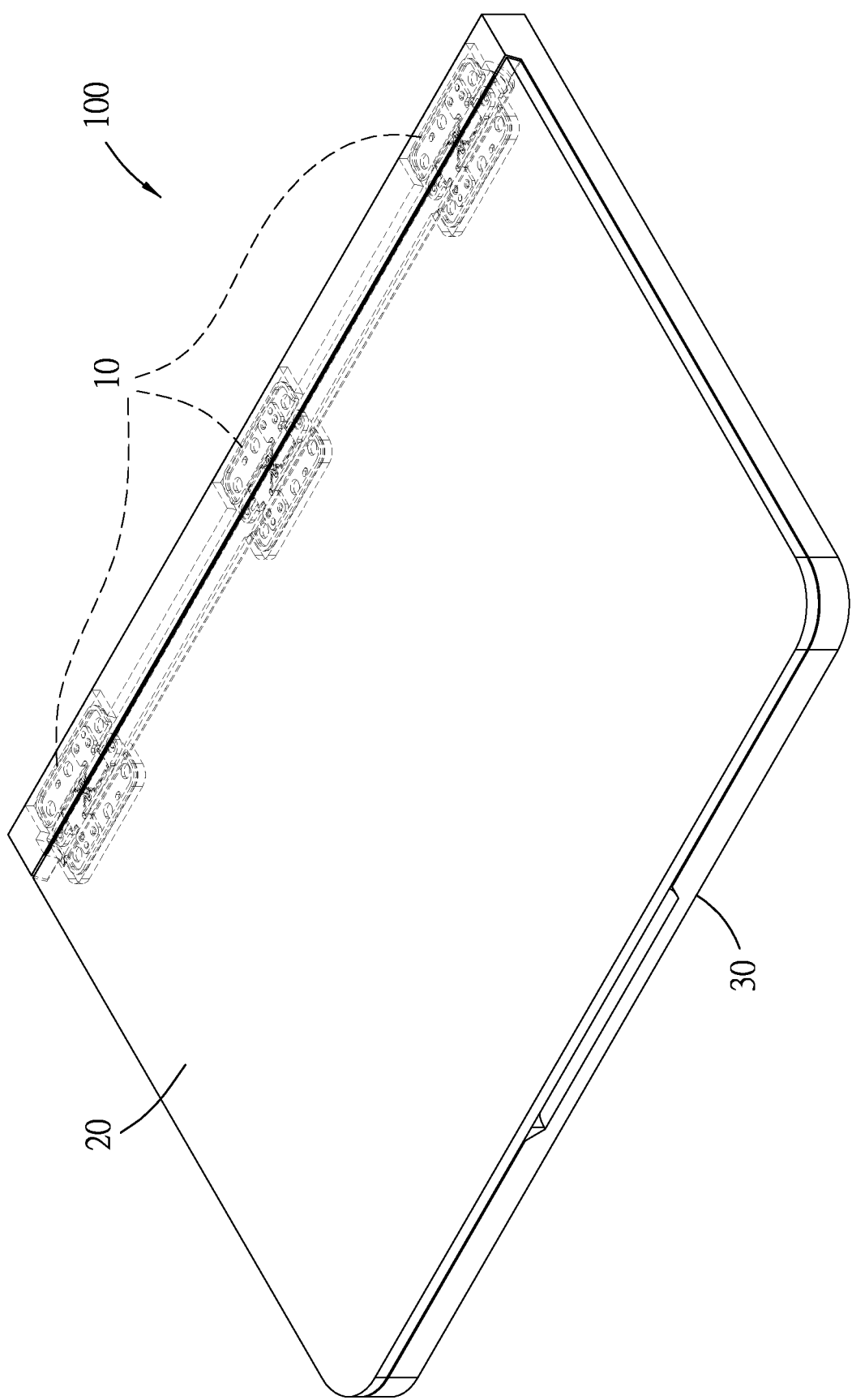
FIG. 1 is a perspective view illustrating an embodiment of a hinge according to the disclosure mounted between a first device part and a second device part, wherein a rotating unit of the embodiment is in a first position.
Figure 2:
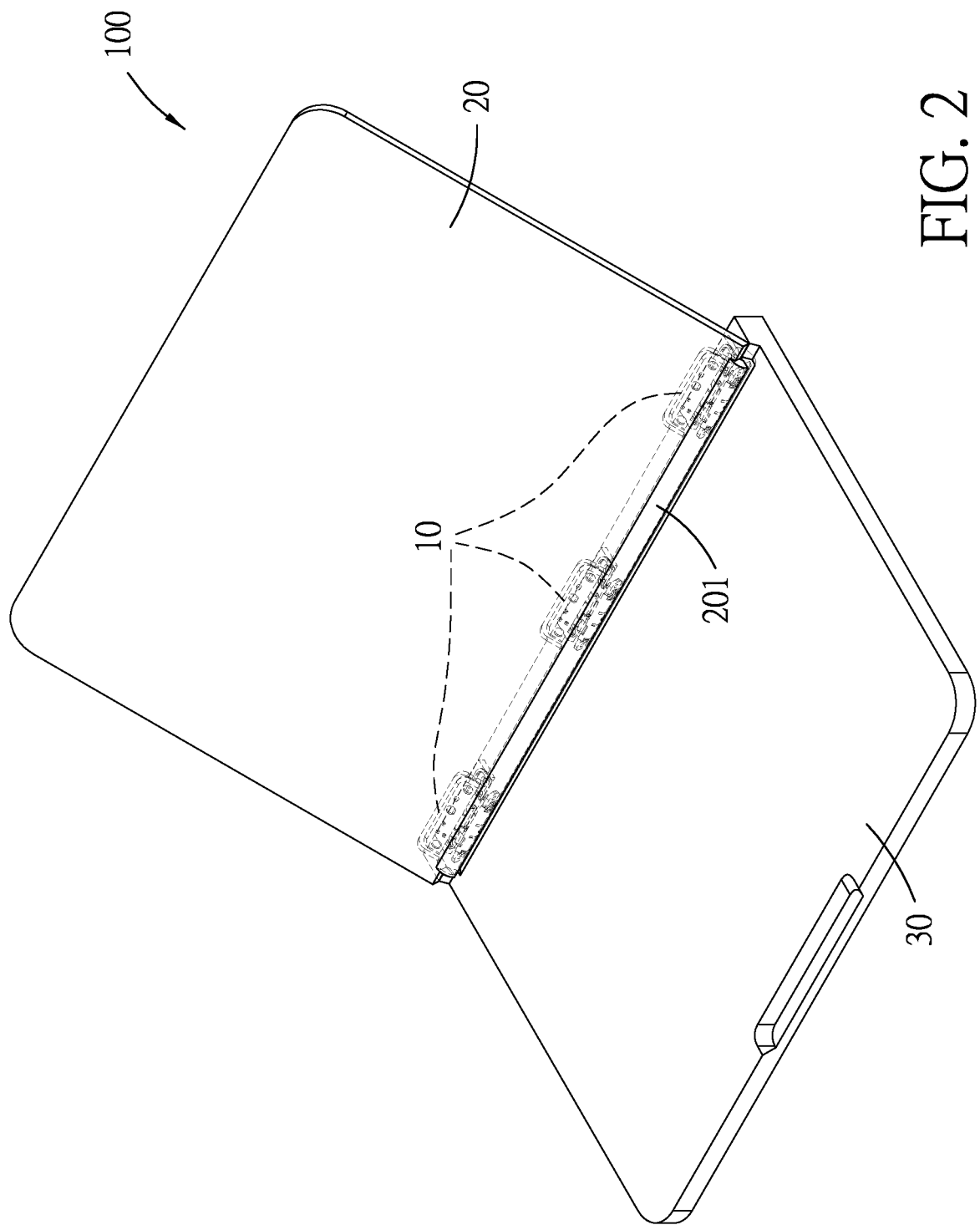
FIG. 2 is a perspective view similar to FIG. 1, illustrating that the rotating unit is in a second position.
Figure 3:
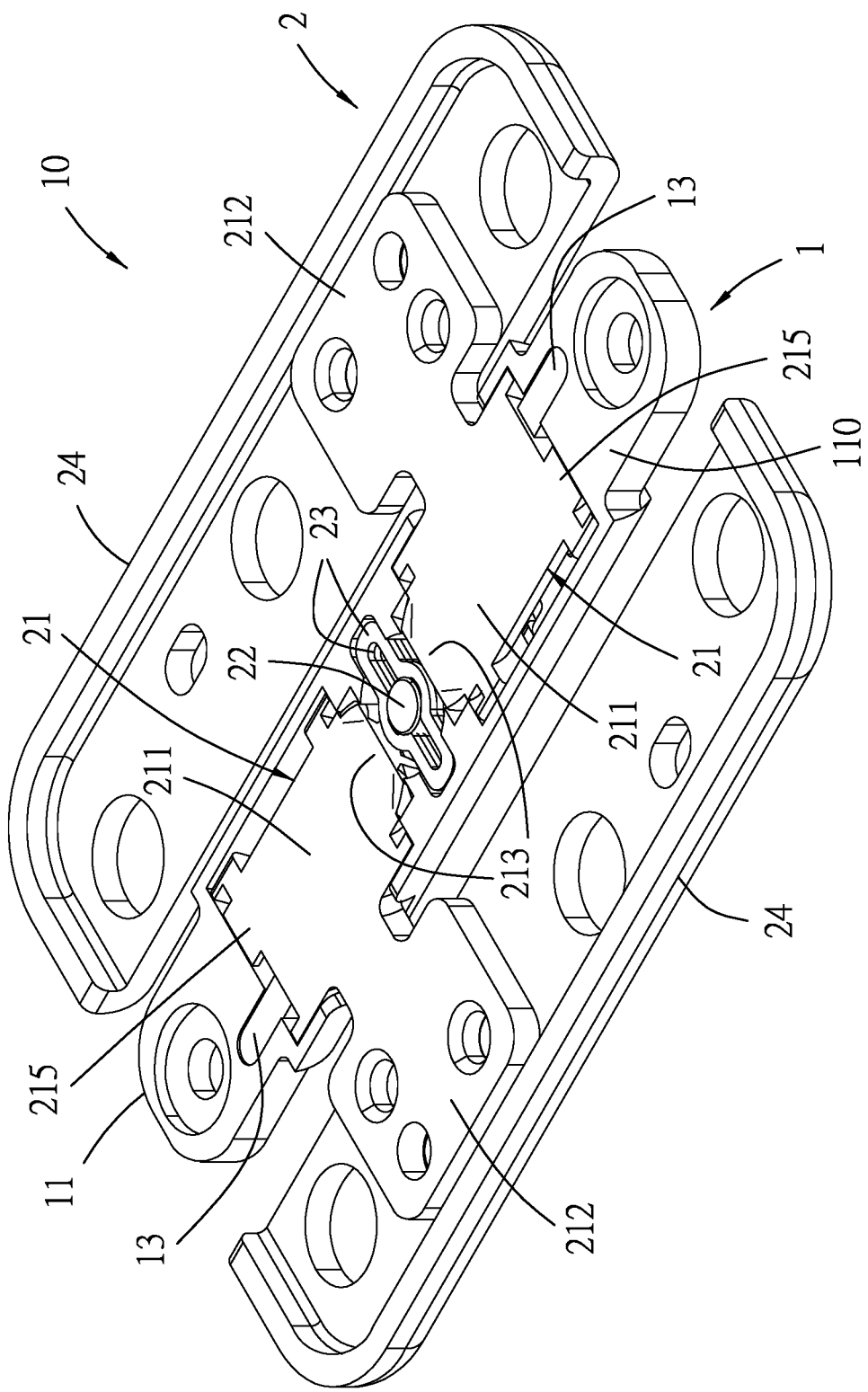
FIG. 3 is a perspective view of the embodiment, illustrating that the rotating unit is in the first position.

Referring to FIGS. 1 to 3, an embodiment of a hinge 10 according to the disclosure is adapted to be mounted between a first device part 20 and a second device part 30 of an electronic device 100. The electronic device 100 may be a foldable device such as a smart phone, a panel computer, a notebook, or a handheld device. In this embodiment, the electronic device 100 is a notebook on which three of the hinges 10 are mounted, and the first device part 20 has a keyboard and the second device part 30 has a display screen. Each hinge 10 includes a base frame unit 1 and a rotating unit 2. The number of the hinges 10 mounted on the electronic device 100 may be varied according to the size of the electronic device 100 and the required frictional torque thereof.

Figure 4:
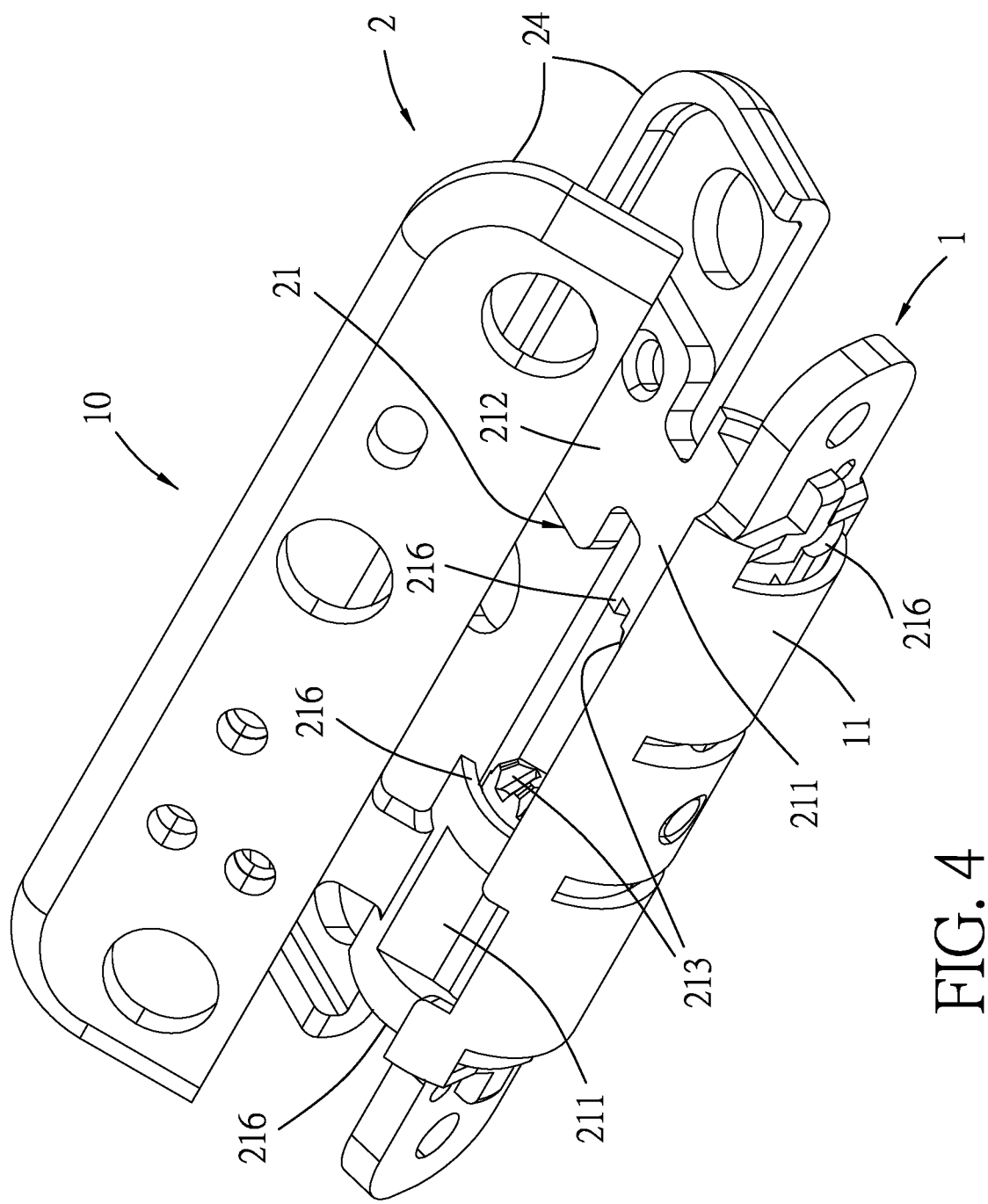
FIG. 4 is a perspective view of the embodiment, illustrating that the rotating unit is in the second position.
Figure 5:
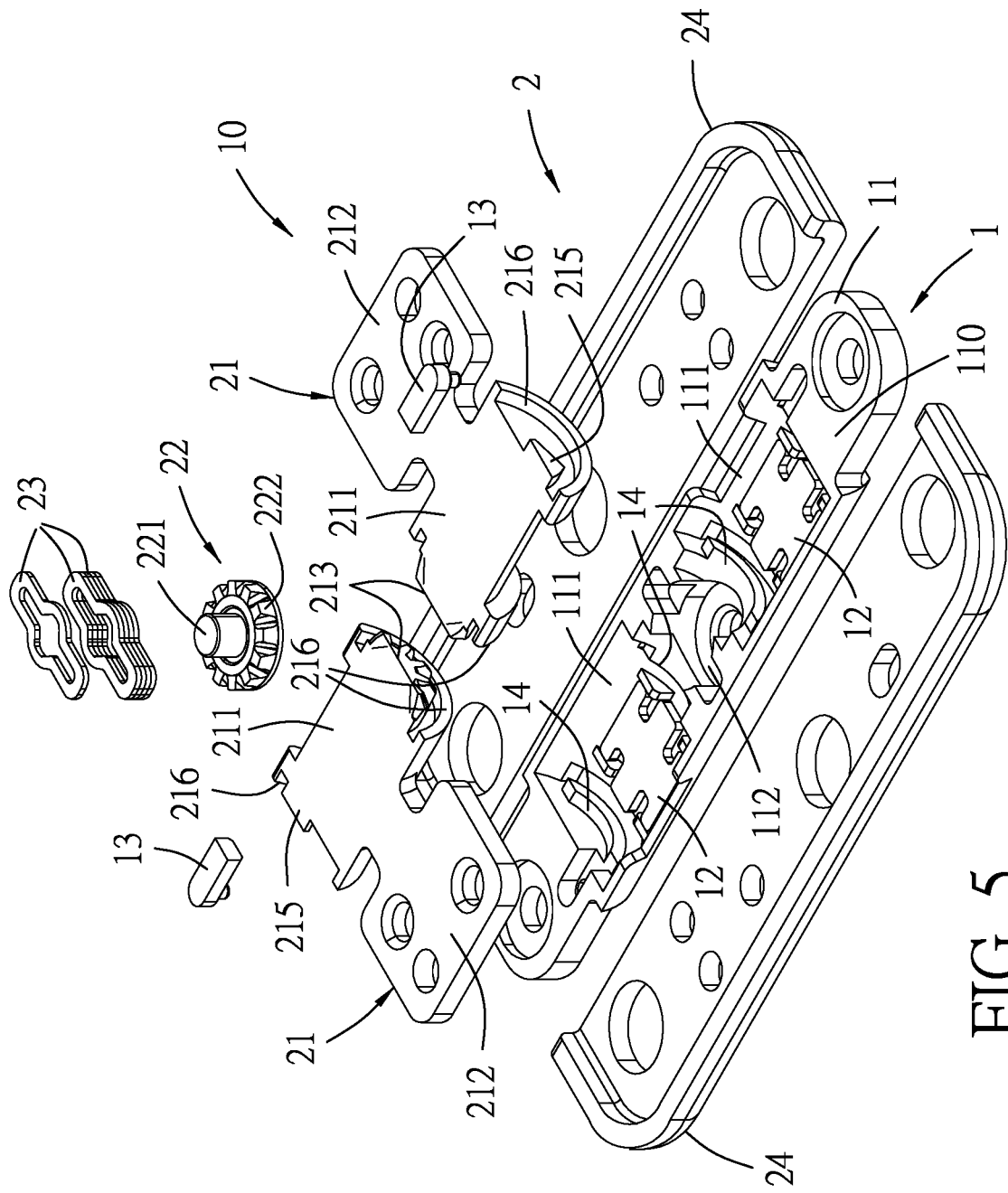
FIG. 5 is an exploded perspective view of the embodiment.

With reference to FIGS. 3 to 5, the base frame unit 1 includes a base seat 11 which is elongated in a front-rear direction, two interfering plates 12 disposed on the base seat 11, and two abutment blocks 13 which are disposed on the base seat 11. The base seat 11 has an upper plate surface 110, two rotating recesses 111 recessed from the upper plate surface 110 and spaced apart from each other in the front-rear direction, and a transmitting recess 112 recessed from the upper plate surface 110 and interposed between and in communication with the rotating recesses 111. The base seat 11 further has two pairs of arcuate rails 14, each pair being respectively mounted in two ends of a respective one of the rotating recesses 111. The interfering plates 12 are disposed in the rotating recesses 111, respectively. The abutment blocks 13 respectively extend into the rotating recesses 111 and at the ends away from the transmitting recess 112. The upper surfaces of the abutment blocks 13 are flush with the upper plate surface 110 of the base seat 11. It is noted that the base seats 11 of the three hinges 10 may be disposed on a connecting bar 201 of the electronic device 100 (see FIG. 2) so as to permit synchronous movements of the hinges 10.

Figure 6:
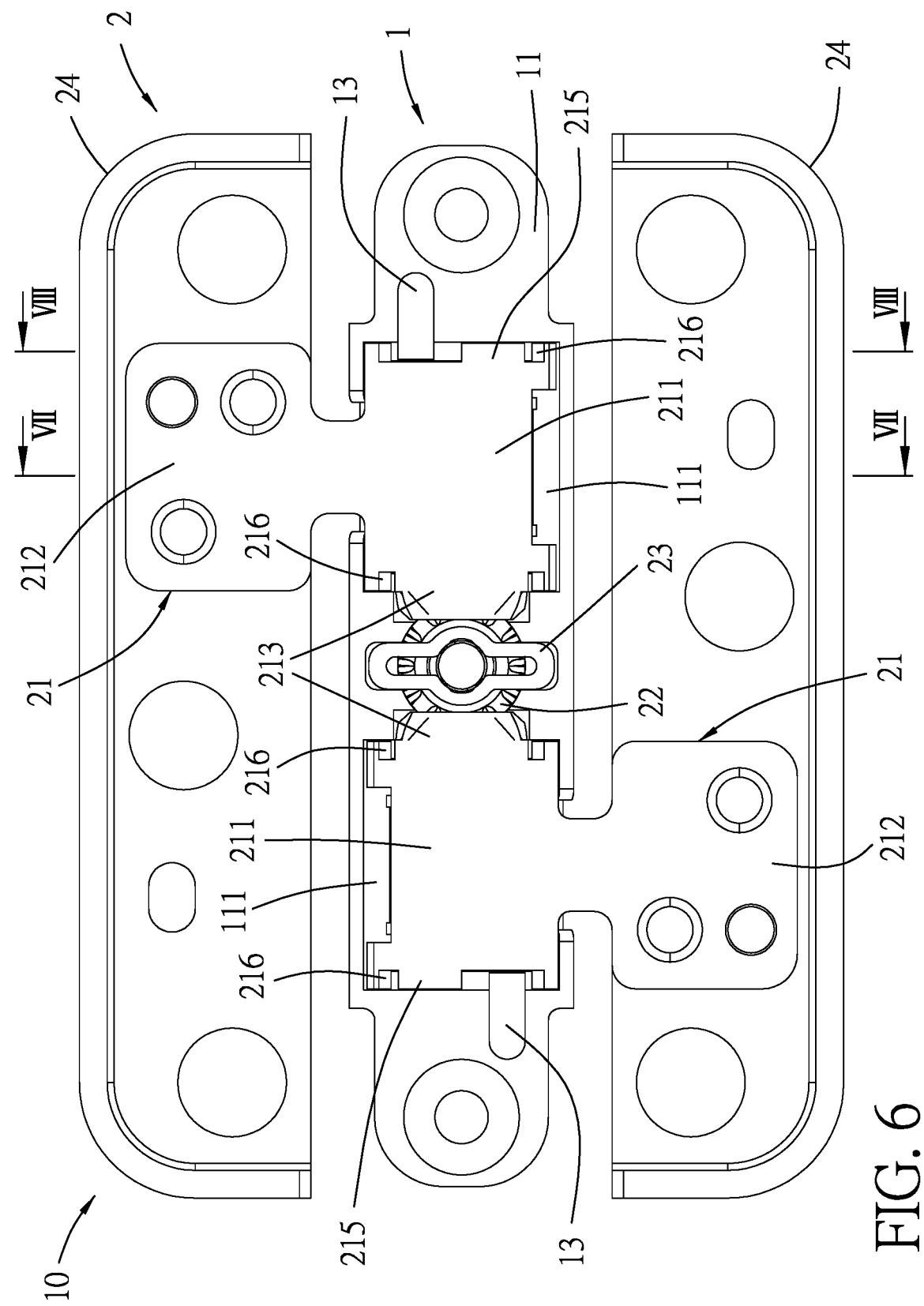
FIG. 6 is a top view of the embodiment, illustrating that the rotating unit is in the first position.
Figure 7:
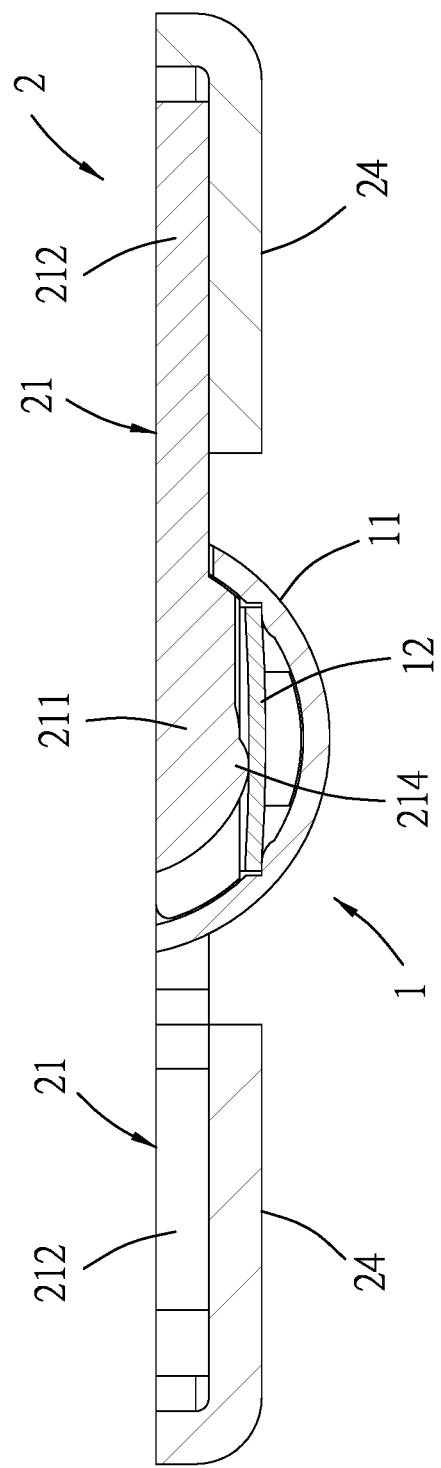
FIG. 7 is a sectional view taken along line VII-VII of FIG. 6.
Figure 8:
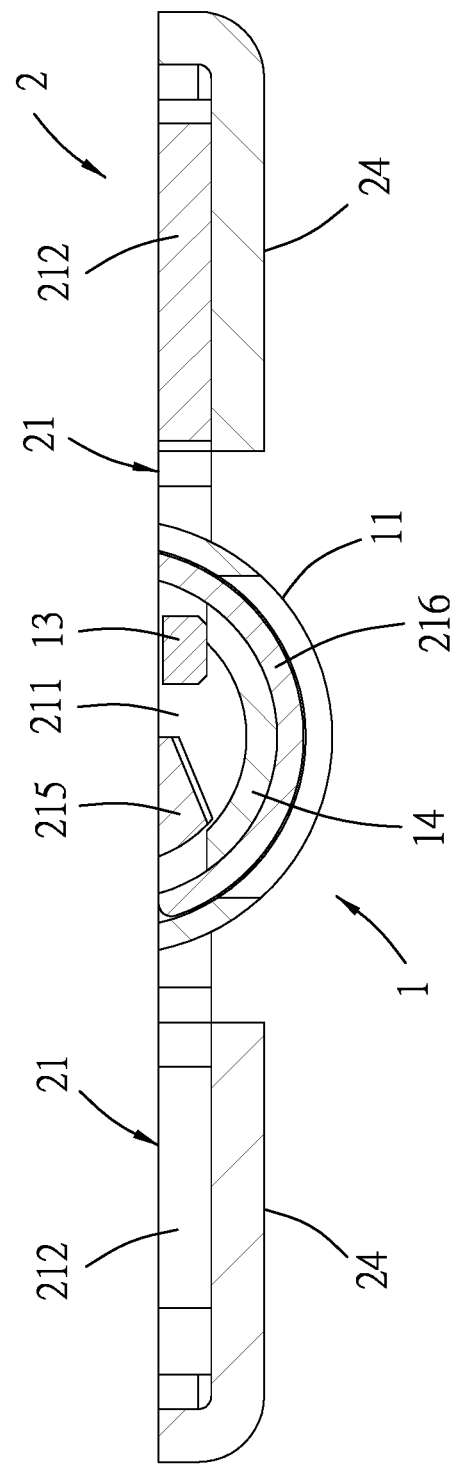
FIG. 8 is a sectional view taken along line VIII-VIII of FIG. 6.

With reference to FIGS. 5 to 7, the rotating unit 2 includes two rotating members 21 which are respectively and rotatably disposed in the rotating recesses 111, a bevel gear member 22 which is disposed in the transmitting recess 112, five frictional plates 23 which are sleeved around the bevel gear member 22, superimposed upon one another, and securely received in the transmitting recess 112, and two brackets 24 which are respectively and securely connected with the rotating members 21. Each rotating member 21 frictionally interferes with a respective one of the interfering plates 12, and has a rotating body 211 which is disposed in the corresponding rotating recess 111, an arm plate 212 which is connected with the rotating body 211 and which laterally extends from the rotating body 211 and outwardly of the corresponding rotating recess 111 to be securely connected with the corresponding bracket 24, a bevel gear portion 213 which is formed on a proximate end of the rotating body 211 proximate to the transmitting recess 112 and which meshes with the bevel gear member 22, a frictional protrusion 214 which projects downwardly from the rotating body 211 and which frictionally interferes with the corresponding interfering plate 12, a stopped protrusion 215 which projects from a distal end of the rotating body 211 distal from the transmitting recess 112, and two arcuate rims 216 which are respectively formed on the two ends of the rotating body 211. The stopped protrusion 215 is engageable with the corresponding abutment block 13 to constrain the rotation of the rotating member 21. The arcuate rims 216 are movably disposed under and slidable along the arcuate rails 14, respectively, so as to permit the rotation of the corresponding rotating member 21 and to restrict an upward movement of the corresponding rotating member 21 relative to the base seat 11. The bevel gear member 22 has an upright axle portion 221 and a gear portion 222 surrounding and securely connected with the upright axle portion 221. The frictional plates 23 are sleeved around the upright axle portion 221. The bevel gear portions 213 of the rotating members 21 mesh with the gear portion 222 of the bevel gear member 22. The brackets 24 are respectively and securely connected with the arm plates 212 of the rotating members 21. Each bracket 24 extends along the base seat 11 in the front-rear direction and is spaced apart from the base seat 11 in a left-right direction. The brackets 24 are respectively connected with the first and second device parts 20, 30.

Figure 9:
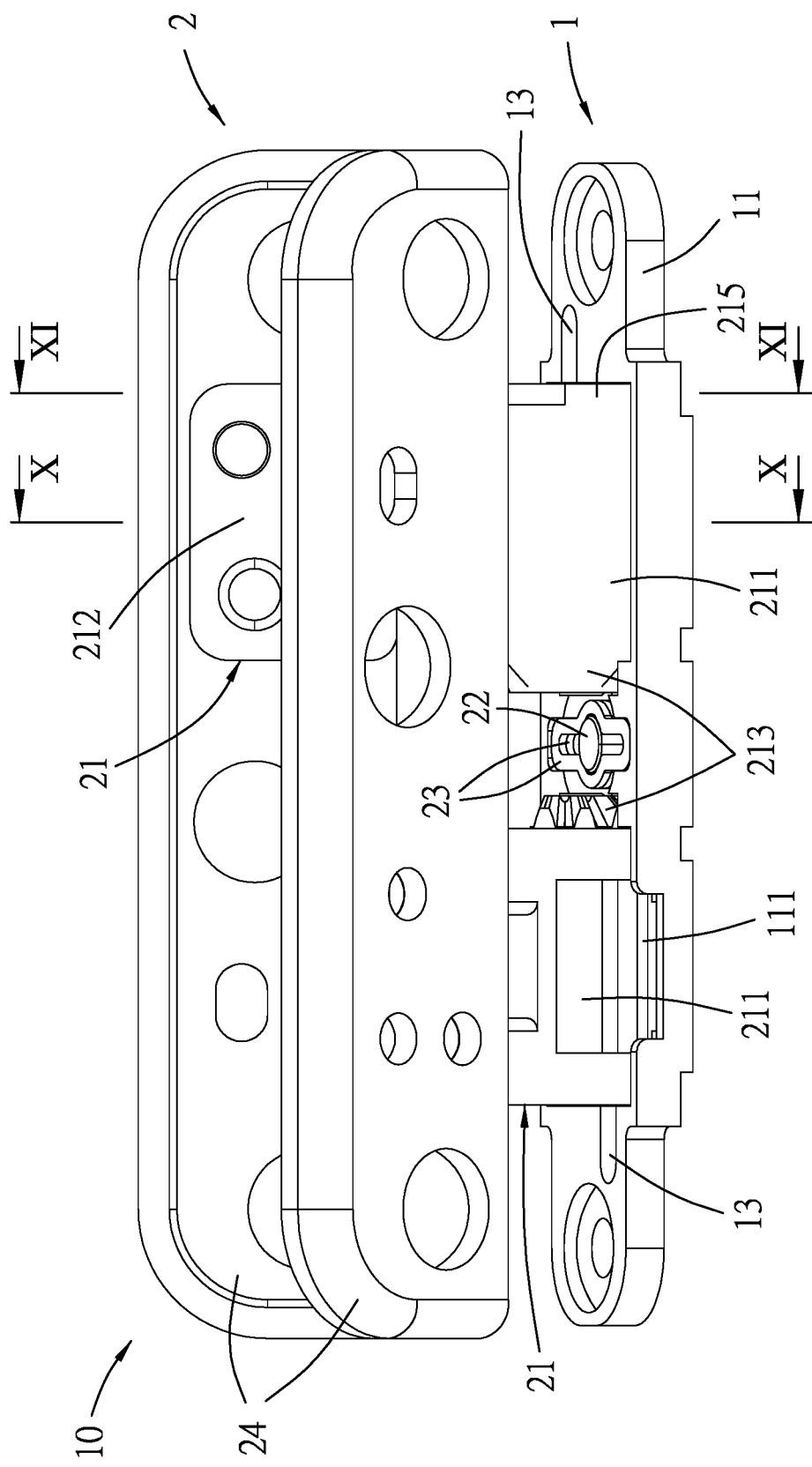
FIG. 9 is a top view of the embodiment, illustrating that the rotating unit is in the second position.
Figure 10:
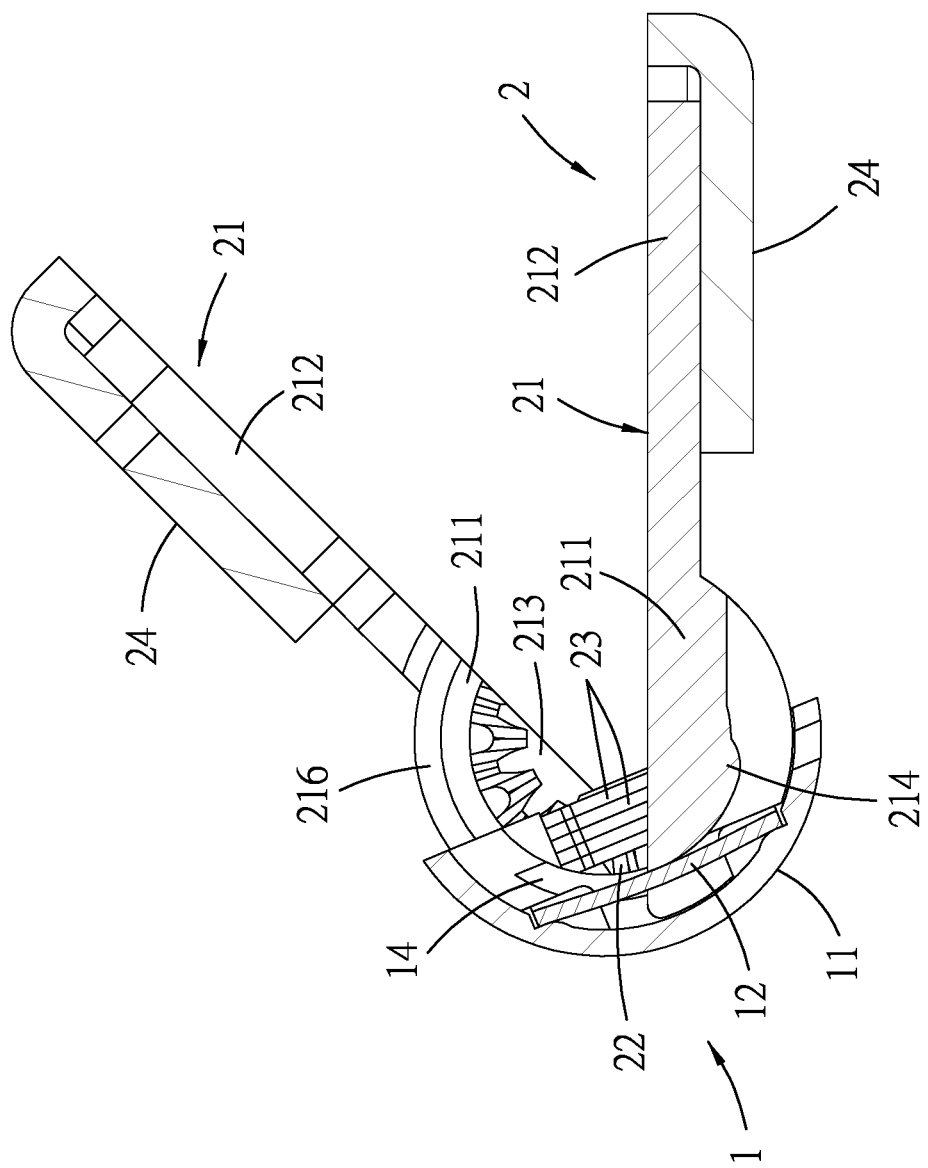
FIG. 10 is a sectional view taken along line X-X of FIG. 9.
Figure 11:
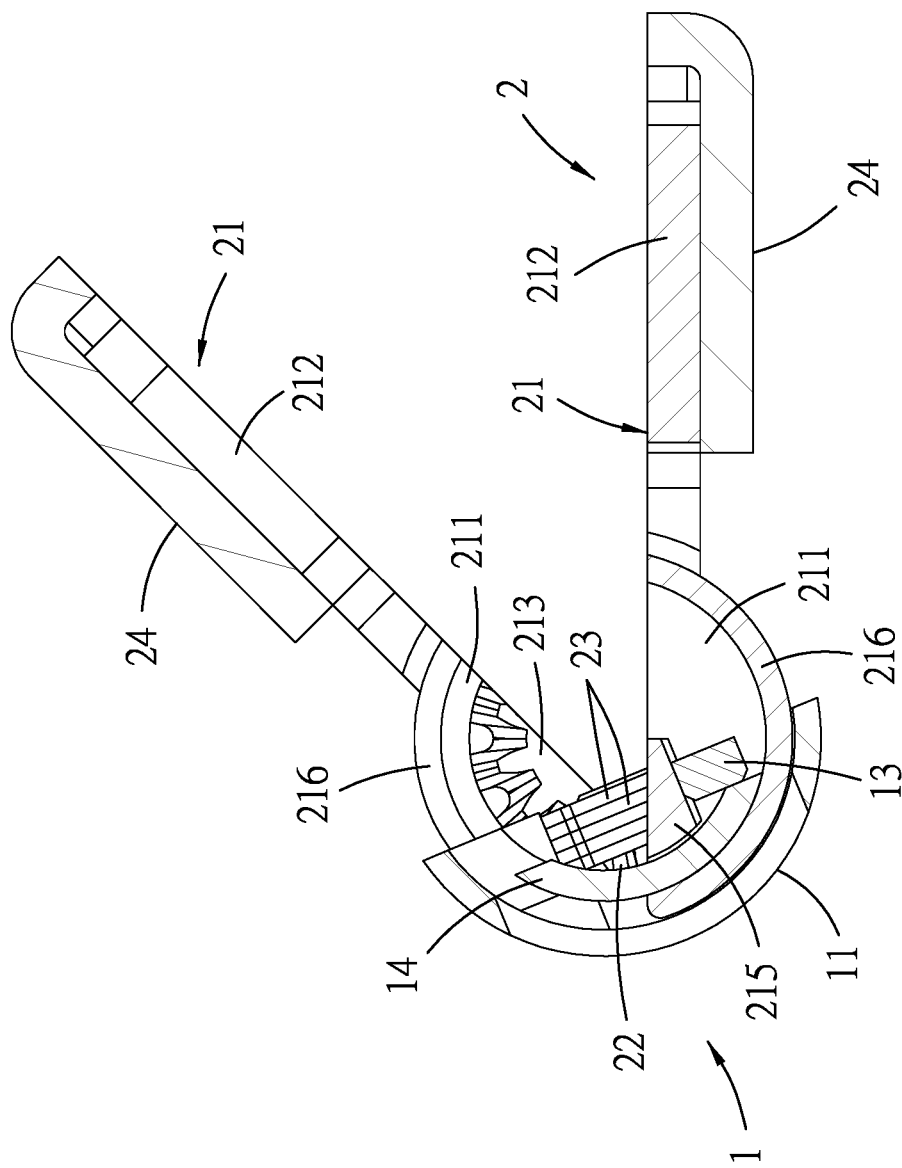
FIG. 11 is a sectional view taken along line XI-XI of FIG. 9.

With reference to FIGS. 1, 3, 7 and 8, the rotating unit 2 is movable between a first position and a second position. In the first position, the rotating members 21 are flush with the upper plate surface 110 of the base seat 11 to bring the first device part 20 and the second device part 30 parallel to each other in a folded state, and the frictional protrusions 214 respectively and frictionally interfere with the interfering plates 12. When the electronic device 100 is in use, the first device part 20 is pressed and the three hinges 10 are moved synchronously. When one rotating member 21 of each hinge 10 is rotated relative to the base seat 11, the other rotating member 21 is rotated relative to the base seat 11 by means of the meshing of the bevel gear portions 213 with the bevel gear member 22. With reference to FIGS. 9 to 11, during rotation of the rotating members 21, the frictional protrusions 214 respectively and frictionally interfere with the interfering plates 12, the arcuate rims 216 are movable along the arcuate rails 14 and are guarded from an upward movement, and the upright axle portion 221 of the bevel gear member 22 generates a frictional force with the frictional plates 23, such that a sufficient large frictional torque is produced even in the hinge 10 with a small size, which renders the hinge 10 stable and reduces undesired shaking. Moreover, the rotating members 21 having a larger frictional area prolong their service life. In a second position, each of the rotating members 21 is pivoted relative to the base seat 11 by a predetermined angle to have the stopped protrusions 215 be engaged with the corresponding abutment blocks 13. With reference to FIGS. 2 and 4, in the second position, the first device part 20 is turned relative to the second device part 30 in an unfolded state, and the connecting bar 201 is turned upwardly by the base seats 11 of the hinges 10 to be exposed between the first device part 20 and the second device part 30. At this stage, the connecting bar 201 conceals and protects the base seats 11.

As illustrated, a torque generated as a result of rotation of one of the rotating members 21 relative to the base seat 11 is transmitted through the bevel gear member 22 to rotate the other one of the rotating members 21 relative to the base seat 11 so as to make synchronous rotation of the rotating members 21 in opposite directions. Also, with the rotating members 21 rotatably received in the rotating recesses 111 and frictionally interfering with the interfering plates 12, with the arcuate rims 216 of the rotating members 21 guarded by the arcuate rails 14, and with the upright axle portion 221 of the bevel gear member 22 generating a frictional force with the frictional plates 23, a sufficient large frictional torque is produced during rotation of the rotating members 21 even in the hinge 10 with a small size, which renders the hinge 10 stable and reduces undesired shaking. The rotating members 21 having a larger frictional area prolong their service life.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge comprising:
   a base frame unit including a base seat which is elongated in a front-rear direction, and two interfering plates, said base seat having an upper plate surface, two rotating recesses recessed from said upper plate surface and spaced apart from each other in the front-rear direction, and a transmitting recess recessed from said upper plate surface and interposed between and in communication with said rotating recesses, said interfering plates being disposed in said rotating recesses, respectively; and
   a rotating unit including two rotating members which are respectively and rotatably disposed in said rotating recesses, and a bevel gear member which is disposed in said transmitting recess, each of said rotating members frictionally interfering with a respective one of said interfering plates, and having a bevel gear portion which meshes with said bevel gear member such that, a torque generated as a result of rotation of one of said rotating members relative to said base seat is transmitted through said bevel gear member to rotate the other one of said rotating members relative to said base seat so as to make synchronous rotation of said rotating members in opposite directions.

2. The hinge as claimed in claim 1, wherein each of said rotating members has a rotating body and a frictional protrusion which projects downwardly from said rotating body, said bevel gear portion being formed on a proximal end of said rotating body proximate to said transmitting recess, said frictional protrusion frictionally interfering with the respective one of said interfering plates.

3. The hinge as claimed in claim 2, wherein each of said rotating members further has a stopped protrusion which projects from a distal end of said rotating body distal from said transmitting recess, said base frame unit further including two abutment blocks which are disposed on said base seat and respectively extend into said rotating recesses, said stopped protrusion being engageable with a respective one of said abutment blocks to constrain the rotation of the respective one of said rotating members.

4. The hinge as claimed in claim 2, wherein said rotating body of each of said rotating members has two arcuate rims respectively at two ends thereof, said base seat further having two pairs of arcuate rails, each pair being respectively mounted in two ends of a respective one of said rotating recesses, said arcuate rims being movably disposed under and slidable along said arcuate rails, respectively, so as to permit the rotation of the respective one of said rotating members and to restrict an upward movement of the respective one of said rotating members relative to said base seat.

5. The hinge as claimed in claim 2, wherein each of said rotating members further has an arm plate which is connected with said rotating body and which laterally extends from said rotating body and outwardly of the respective one of said rotating recesses.

6. The hinge as claimed in claim 5, wherein said hinge is adapted to be disposed between a first device part and a second device part, said rotating unit further including two brackets which are respectively and securely connected with said arm plates of said rotating members, each of said brackets extending along said base seat in the front-rear direction and being spaced apart from said base seat in a left-right direction, said brackets being for respectively connecting with the first and second device parts.

7. The hinge as claimed in claim 6, wherein said rotating unit is movable between a first position, where said rotating members are flush with said upper plate surface of said base seat to bring the first device part and the second device part parallel to each other in a folded state, and a second position, where each of said rotating members is pivoted relative to said base seat by a predetermined angle to turn the first device part relative to the second device part in an unfolded state.

8. The hinge as claimed in claim 1, wherein said bevel gear member has an upright axle portion and a gear portion surrounding and securely connected with said upright axle portion, said bevel gear portions of said rotating members meshing with said gear portion of said bevel gear member, said rotating unit further including a plurality of frictional plates which are sleeved around said upright axle portion, superimposed upon each other, and securely received in said transmitting recess.

\* \* \* \* \*